SIGNAL CONVERTING SYSTEMS

Filed June 21, 1955 3 Sheets-Sheet 1

INVENTOR.
GUNTHER J. MARTIN
BY William R. Sherman
ATTORNEY

Dec. 20, 1960 G. J. MARTIN 2,965,891

SIGNAL CONVERTING SYSTEMS

Filed June 21, 1955 3 Sheets-Sheet 2

INVENTOR.
GUNTHER J. MARTIN
BY William P. Sherman
ATTORNEY

Dec. 20, 1960 G. J. MARTIN 2,965,891
SIGNAL CONVERTING SYSTEMS
Filed June 21, 1955 3 Sheets-Sheet 3

INVENTOR.
GUNTHER J. MARTIN
BY William R. Sherman
ATTORNEY 2,965,891
Patented Dec. 20, 1960

2,965,891

SIGNAL CONVERTING SYSTEMS

Gunther J. Martin, Ridgefield, Conn., assignor, by mesne assignments, to Schlumberger Well Surveying Corporation, Houston, Tex., a corporation of Texas Filed June 21, 1955, Ser. No. 516,868
12 Claims. (Cl. 340—347)

This invention relates to signal converting systems and, more particularly, to systems for converting signals into permutation coded pulses and for converting pulses of a permutation code into signals representing their coded value.

In the handling of information by electrical apparatus, substantial advantages often are attainable by conversion of an information signal between a variable potential wave and permutation coded pulses. For example, measured data commonly are manifested by variable potential waves, whereas a bulk of similar data is more conveniently stored with a permutation coded manifestation, such as a simple binary coding. Where the variable data signal is to be combined with a signal coded to represent stored values, a conversion of one of the signals to the form of the other signal is required. For most applications, speed and accuracy are the primary criteria for a signal converting system.

In past systems wherein conversion has been accomplished by electronic techniques, adequately high speeds of conversion have generally been obtained, but at an accuracy too low for precise machine calculations and other purposes.

Accordingly, it is an object of this invention to provide new and improved signal converting systems for effectively converting signals between a continuously variable and a coded form.

Another object of this invention is to provide new and improved systems for speedily converting variable signals into binary code groups with a high degree of accuracy.

Another object of this invention is to provide such systems wherein the accuracy obtained is enhanced by minimizing the effects of changing tube characteristics.

Still another object of this invention is to provide new and improved apparatus for generating a signal representing the value of a binary code group with speed and accuracy.

Yet a further object of the invention is to provide such systems and apparatus which are relatively inexpensive, serviceable and rugged.

These and other objects are attained, in accordance with the invention, by summing currents having fixed values corresponding to the orders of a binary coded signal selectively in a resistive summing network. Selective switching of the fixed currents is effected by shunt-type diode switches responsive to the value of the binary coded signal in its respective orders. Each diode switch comprises a switching diode and a resistor forming a low resistance shunt path for diverting the corresponding fixed current. Provision is made for selectively driving the switching diode to a reverse operating point effectively to close the shunt path when a binary value of 1 is to be converted to analog form. For preventing zero drift in the analog value represented by the summation of currents, compensating diodes are connected in reversely poled relation to the switching diodes. Accurate summation of the currents is accomplished by directly coupling the summation point for the resistance network to the input of a D.-C. feedback amplifier.

For an analog-to-digital conversion, a variable or analog signal is applied to a resistor coupled to the input of the feedback amplifier at the summation point. By controlling the operation of the diode switches in accordance with the count in a binary counter, an error signal is developed at the feedback amplifier output which is utilized to drive the counter into coded correspondence with the analog signal.

Additional objects and advantages of the invention will become apparent from the following detailed description of a representative embodiment thereof, taken in conjunction with the accompanying drawings, in which.

Figure 1:
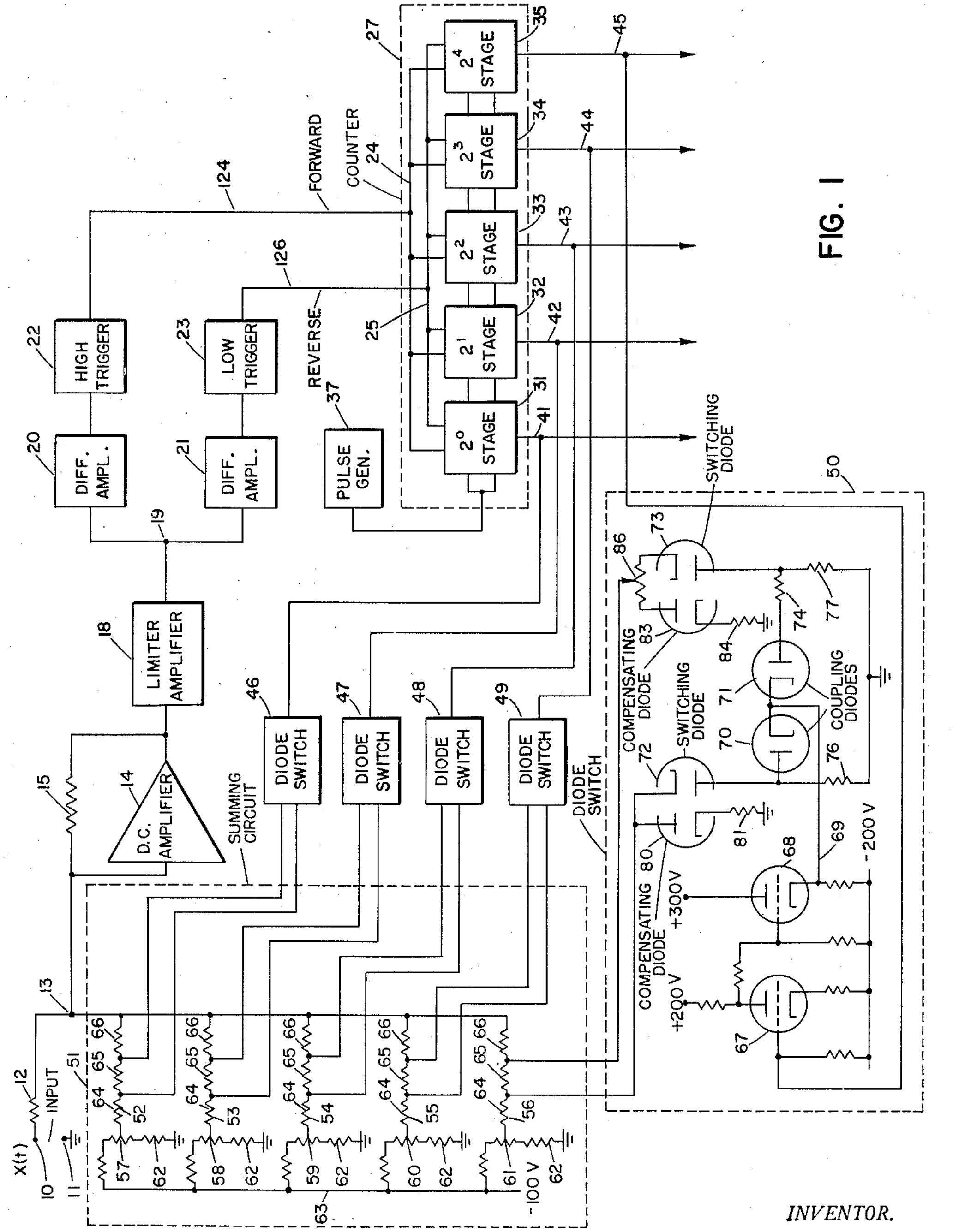
Fig. 1 is a schematic representation of a signal converting system in accordance with the invention, in which portions are shown in block diagram form.

In Fig. 1 there is shown, in accordance with the invention, a system for converting or translating a signal $x(t)$ into a permutation code group of $n$ digits, more particularly, into a 5 digit group according to the simple addition binary code. To obtain a correspondence of the binary code group output to the signal wave input, an inverse feedback circuit is provided. By an algebraic summation of the input wave and a feedback signal, an error signal is obtained which determines the direction of counting necessary to bring the output code group into correspondence with the input wave signal. The error signal is, therefore, effective in the forward transmission path of the system to adjust the value of the binary code group which is to represent within a prescribed degree of accuracy the input wave signal.

Considering now the forward transmission path, there is provided an input terminal 10 to which the input signal $x(t)$ may be applied, having reference to a convenient ground 11. Terminal 10 is coupled through resistor 12 (for example, one megohm) to a junction point 13 at the input of a D.-C. operational feedback amplifier 14. This D.-C. amplifier may be of conventional design, having unity gain and a feedback path comprising a resistor 15 of high value such as 1 megohm. The output of the D.-C. amplifier 14 is coupled through a limiter-amplifier 18 to input junction 19 for a pair of differential amplifiers 20, 21 arranged in parallel.

These differential amplifiers 20, 21 amplify the error signal to provide alternative triggering signals when the error signal lies above or below a specified increment. The magnitude of this increment depends upon the degree of quantization. In the particular case of a five digit code group, the available permutations are $2^5$ or 32. The increment, accordingly, is specified so that an error of less than one-half part in 32 is obtained as an average value. The differential amplifier 20 is arranged to provide a triggering signal to a high trigger 22 whenever the output of the limiter-amplifier 18 represents a positive error of at least one part in 32. Differential amplifier 21 similarly provides a triggering signal to a low trigger 23 whenever the output of the limiter-amplifier 18 represents a significant negative error. The high and low triggers 22, 23 serve, respectively, to energize forward and reverse counting buses 24, 25 of an $n$-stage binary counter 27. The counter 27 is thus energized when the signal at 19 represents an error which may be reduced by a change in the count, the direction of counting being dependent upon the polarity of the error. The energization provided in response to the error signal at 19 by the triggers 22, 23 is in the form of a gate pulse, that is, a pulse of rectangular form having a duration determined by the actuation of the triggers.

While the counter 27 may incorporate any desired number of stages, five stages 31–35 are a convenient number and will serve in many applications. Each stage has two carry circuits representing the alternative binary transitions 1 to 0 and 0 to 1. To the input of the first stage 31 is coupled a pulse generator 37 providing a train of clock pulses having a suitable repetition frequency, such as 10 kilocycles, for turning over flip-flop circuits in each stage. Output lines 41–45 are provided for the respective stages 31–35 to be energized when the corresponding stage is in its 1 state.

The forward transmission path of the system thus accepts a variable wave signal $x(t)$ at its input terminal 10 and furnishes on its output lines 41–45 a pulse group coded in the simple addition binary code. The feedback signal path proceeds from the output lines 41–45 and connects at the junction 13 to furnish a feedback signal as a component of the input to D.-C. amplifier 14.

Output lines 41–45 are, more particularly, connected to the inputs of corresponding diode switches 46–50, which may be of identical design corresponding to that illustrated for the switch 50. These diode switches 46–50 are of the shunt-type in that they selectively divert the current in a conductive circuit rather than interrupt the circuit itself, as a series switch does.

Connected to the diode switches 46–50 for control thereby is a resistive summing network 51 comprising five identical resistance circuits 52–56 having a common junction at 13. In order that currents passing through the resistance circuits 52–56 may be proportioned as 1, 2, 4, 8, and 16 in correspondence with the output values of the binary counter 27, potentials similarly proportioned are applied to the respective circuits at tap points 57–61 along potential dividers 62. Across the potential dividers 62 is applied a regulated potential via a supply bus 63. The positions of the tap points 57–61 then govern the proportioning of currents in the resistance circuits 52–56 in accordance with a geometric progression. To provide a suitable input impedance to the feedback amplifier 14, each of resistance elements 52–56 consists of three series resistors 64–66, which may, for example, have precise values of 0.5, 0.5 and 1.0 megohm, respectively. The resistors 64 are connected to the respective tap points 57–61, while resistors 66 are connected to the common junction 13.

When a stage of the binary counter is in the 1 state, the associated diode switch allows passage of the corresponding current to the common junction 13, thence to the input of the D.-C. amplifier 14. In order that this may be so, each output line of the binary counter 27 is resistively coupled through a phase inverter 67 to cathode follower 68 which provides gate pulses on its output line 69 of positive or negative polarity depending upon the 0 or 1 state of the associated counter stage. The cathode follower output 69 is connected to the cathodes of coupling diodes 70, 71 having their anodes connected to the anodes of switching diodes 72, 73, respectively, there being a resistor 74 between the anodes of diodes 71, 73. The anodes of diodes 72, 73 are connected through respective potential dropping resistors 76, 77 to a source of a reference potential positive with respect to the potential of supply bus 63. This source of potential may conveniently be ground. The resistor 76 together with diode 72 forms a first shunt circuit between ground and the junction of resistors 64, 65. Similarly, resistor 77 and diode 73 form a second shunt circuit between ground and the junction of resistors 65, 66. It may be observed that coupling diodes 70, 71 are connected in similarly poled relation to the corresponding switching diodes 72, 73 with respect to ground.

These two shunt circuits provided by each diode switch for the corresponding resistance path of network 51 serve cumulatively to divert current from the common junction 13 when the output of the corresponding counter stage is a binary 0. In order that zero drift in the potential at the junction of resistors 64, 65 may be minimized when current is diverted through the first shunt path constituted by diode 72 and resistor 76, compensation for cathode heater drift and other changing characteristics of diode 72 is provided by a parallel shunt path comprising a compensating diode 80 and a resistor 81. The compensating diode 80 is connected to diode 72 in oppositely poled relation and preferably is contained in the same envelope with the diode 72. Resistor 81 preferably is of identical value to resistor 76 and may, for example, be 10 kilohms. Similarly for the second shunt circuit, a parallel circuit comprising diode 83 and a resistor 84 is provided for compensating changing diode characteristics. Resistor 84 preferably is identical to resistor 77 having a value, for example, of 4.7 kilohms. The balancing of the second shunt circuit and its parallel compensating circuit being so important to the accuracy of conversion, there is provided a balancing potentiometer 86 having its resistance element connected between the cathode of diode 73 and anode of diode 83 and its wiper connected to the junction of resistors 65, 66. This balancing potentiometer permits, by an adjustment of the wiper 86, an accurate balancing of the parallel circuits to compensate for any lack of identity in the effective resistance values of the diodes 73 and 83.

Illustrative of the vacuum tube characteristics of diodes 72, 73 as well as the compensating diodes 80, 83 is curve 90 (Fig. 2) scaled in relation to anode potential E along the abscissa and in relation to anode current I along the ordinate. Point 91 marked on the curve represents a typical reverse operating point for the diodes wherein the diode resistance is exceedingly large, being on the order of 100 megohms or higher. When the diodes 72, 73 are switched to their conducting state, they may be characterized by an operating point 92 representing a potential on the anode slightly positive with respect to the cathode. For the compensating diodes 80, 83 a reverse potential of substantially the same magnitude is obtained resulting in an operating point 93. As may be seen, the slope of the curve 90 at points 92 and 93 is almost identical, representing substantial identity of the effective resistances for diodes 72 and 80 or for diodes 73 and 83. When the shunting and compensating diodes are supplied with the same regulated heater potential and are subject to the same ambient temperatures, changes in the effective battery action of these diodes due to changes in cathode emission are in the same proportion. Since the switching and compensating diodes are oppositely poled, the changes will consequently be self cancelling. At the same time, the slope of the diode characteristic representing the effective resistance of the diodes tends to remain unchanged despite cathode heater drifts and aging of the diodes.

Figures 2, 3:
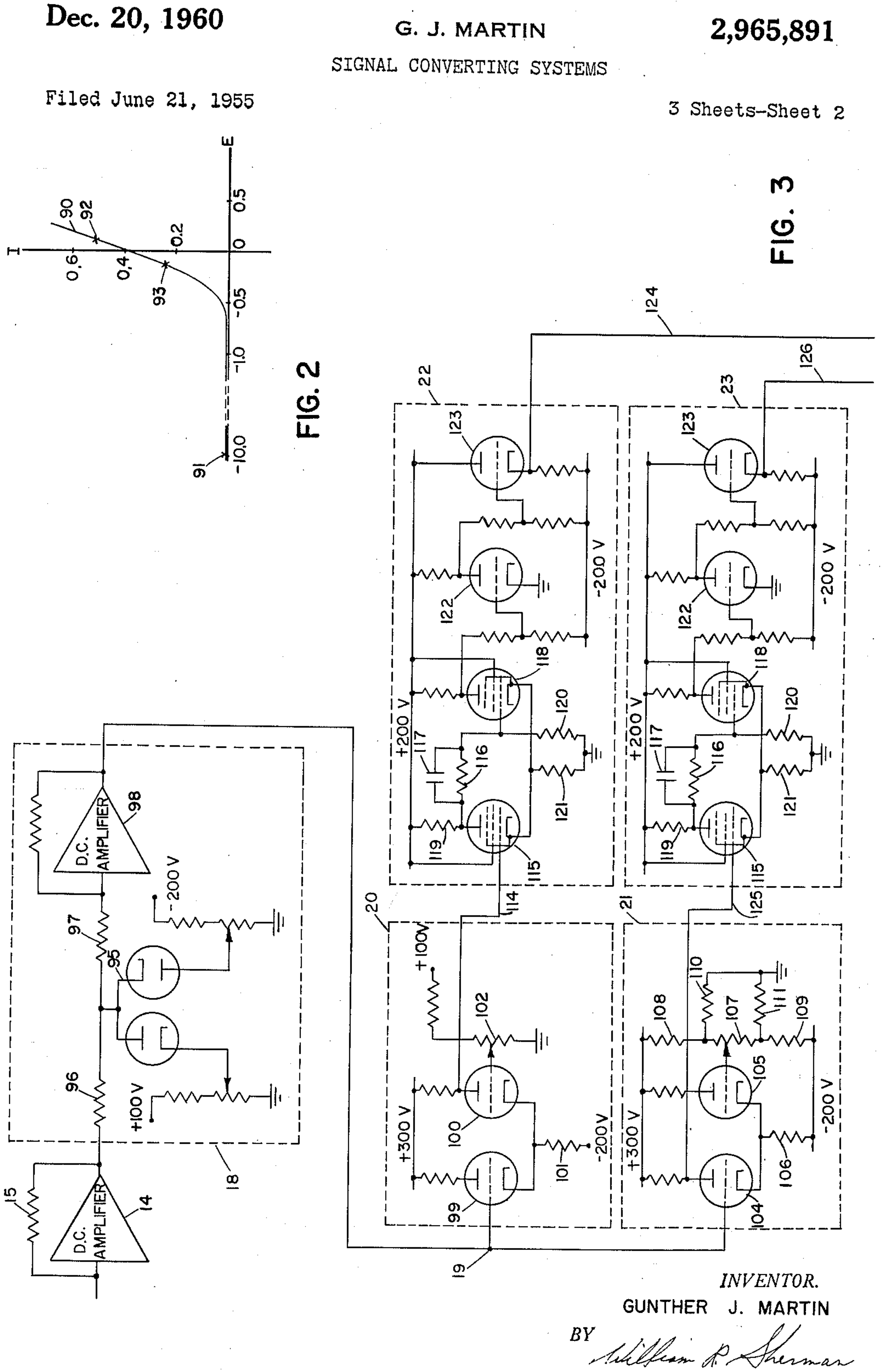
Fig. 2 is a graphical illustration of a typical high vacuum diode characteristic.
Figs. 3 and 4 are schematic circuit diagrams of portions of the system shown in Fig. 1.
Figure 4:
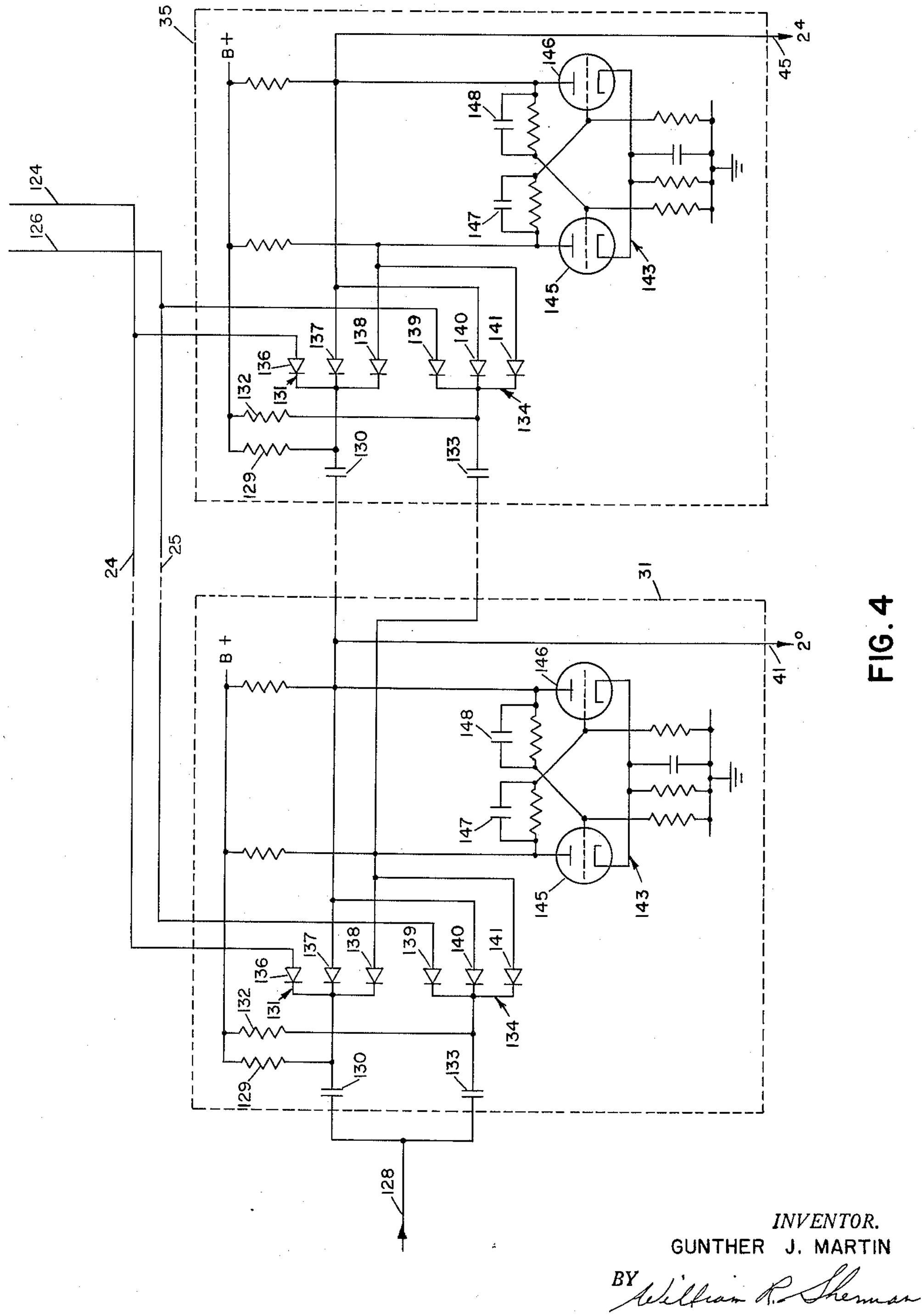

Circuit details of portions of the system shown in Fig. 1 are depicted in Figs. 3 and 4 to which reference is now made. In the limiter-amplifier 18, limiting action is obtained by means of a double-diode limiting circuit 95 connected intermediate coupling resistors 96, 97 which are serially connected between D.-C. amplifier 14 and a similar D.-C. feedback amplifier 98. Amplifier 98 may have an appreciable gain, such as a gain of ten.

Differential amplifier 20, to which the output of D.-C. amplifier 98 is connected through junction point 19, comprises input and reference triodes 99, 100 having a common cathode resistor 101 and means for setting the bias potential for the control grid of the reference triode 100, namely, potentiometer 102. Similarly, the parallel-connected differential amplifier 21 comprises input and reference triodes 104, 105 with a common cathode resistor 106. In this instance, however, the setting of bias potential for the control grid of the output triode at 105 is more elaborate to ensure against drift. In particular, the means for setting its bias includes a potentiometer 107 having its opposite ends connected through resistors 108 and 109, respectively, to positive and negative supply buses and through resistors 110 and 111 to ground. It may be observed that the bias on the control grid of the reference triode 100 is adjusted to equal the input signal level at which the output potential derived from the anode of this reference triode 100 reaches a critical triggering potential. This potential may, for example, be 20 volts. Similarly, the control grid of the reference triode 105 in differential amplifier 21 is biased to a potential, such as a minus 2 volts, to equal the value of the input signal at which the output potential derived from the anode of input triode 104 reaches the same critical potential. By making the interval between high and low triggering potentials in excess of the interval corresponding to a unit change, the system is rendered stable.

The output signal from the reference triode 100 in differential amplifier 21 is supplied via conductor 114 to the control grid of a normally non-conducting input pentode 115 of the high trigger 22. The anode of the pentode 115 is coupled via resistor 116 and capacitor 117 in parallel to the control electrode of a normally conducting pentode 118. To provide a bias for the control grid of pentode 118, the coupling resistor 116 forms a portion of a potential divider including anode resistor 119 for the first pentode 115 and grid resistor 120 for the second pentode 118. By means of a common cathode resistor 121, feedback coupling is obtained which assists the triggering action of the circuit. A phase inverter 122 is in driving connection with a cathode follower 123 to couple the output from the anode of the pentode 118 to the output line 124 having connection with the forward counting bus 24.

The low trigger 23 is identical to the high trigger 22 in a preferred design. The input signal to this low trigger 23 is derived, however, from the anode of the input triode 104 for the differential amplifier 21 via conductor 125. Coupling the output of the low trigger 23 to the reverse counting bus 25 is a conductor 126.

Referring now to Fig. 4, only the first and last stages 31, 35 of the five stage binary counter 27 are illustrated for convenience of representation. However, it will be understood that the intervening stages, as well as the last stage, may have the precise form of the first stage. The first stage is coupled via an input conductor 128 with the pulse generator 37 to receive therefrom a train of square wave pulses alternating in polarity. To sharpen these pulses, resistance 129 and capacitor 130 form a differentiating circuit preceding a forward counting gate 131, while resistor 132 and capacitor 133 provide a parallel differentiating circuit preceding a backward counting gate 134. The forward counting gate 131 comprises three diodes, 136, 137, 138 which may be of the semiconductor type having their cathodes connected in common to the junction of resistor 129 and capacitor 130. Similarly, the backward counting gate 134 comprises three diodes 139, 140, 141 of the semiconductor type having their cathodes connected to the junction of resistor 132 and capacitor 133. To open the forward counting gate 131 when the forward counting bus 24 is energized, this bus 24 is connected to the anode of diode 136. Correspondingly, the backward counting bus 25 is connected to the anode of diode 139 in the backward counting gate 134.

Diodes 137 and 138 of the forward counting gate 131 are connected with the respective anode circuits of a bistable multivibrator or flip-flop 143, thus providing a forward counting input. The diodes 140 and 141 of the backward counting gate 134 likewise are connected with the respective anode circuits of the multivibrator 143 to provide a backward counting input. While the forward and backward counting gates 131, 134 in the first stage 31 of the counter thus provide a similar counting response to input clock pulses (as is required for either subtraction or addition of the binary count), these gates in succeeding stages will determine from which anode circuit of a preceding stage carry pulses are transferred. Thus, a negative going carry pulse from a preceding stage is applied to the forward counting gate when the turnover or transition of such preceding stage is from a 1 state to a 0 state. On the other hand, a negative going pulse is applied to the backward counting gate 134 when the preceding stage has a transition from a 0 state to the 1 state.

To make more evident this relationship of the multivibrator transitions of each stage to the gates 131, 134 of the next succeeding stage, each multivibrator 143 will be understood to comprise a first triode 145 which is non-conductive in the 0 state of the multivibrator and a second triode 146 which is non-conductive in the 1 state of the multivibrator. Coupling circuits 147 and 148 serve to cross-couple the anodes and control grids of triodes 145 and 146. In view of this cross-coupling, whichever grid has been held positive by the non-conductance of the other tube is driven negatively by the application of gated negative-going counting pulses to the anodes of both triodes. In consequence, the conducting triode will be driven to cutoff and its rising anode potential will be coupled to the control grid of the other triode, thereby reversing the states of conductance and non-conductance of the triodes.

Output line 41 of the first stage of the binary counter is coupled to the anode of the second triode 146 of the first counter stage 31. The succeeding output lines 42–45 are similarly coupled to the anodes of the second triodes for the succeeding counter stages. When any of these second triodes 146 are non-conducting, thus representing the 1 state of the particular stage, the associated output line will be at a high potential approaching that of the B+ supply for the counter. The 0 state of any stage is represented by a more negative voltage on its output line corresponding to the anode potential of the second triode 146 when such triode is conducting. As the anode of triode 146 is coupled to the forward counting gate 131 of the next stage, a negative carry pulse will occur only with a drop in anode potential, i.e., a 1 to 0 transition. Similarly, a negative carry pulse is coupled from the anode of triode 145 to the downwardly counting gate 134 for a 0 to 1 transition.

In an exemplary operation of the above-described system embodying the principles of the invention, a signal wave $x(t)$ varying as a function of time is supplied to the input terminal 10. This signal wave is a positive D.-C. potential which may have a rate of variation such that its highest frequency components are within the frequency response band of the signal converting system.

Assuming that the counter 27 is cleared with each stage in its 0 state, consider an input potential lying between one and two units. The input and hence the output of the D.-C. feedback amplifier 14 will include this component of positive potential. For example, if a unit input at the D.-C. amplifier 14 is represented by two volts and the signal wave applied at input terminal 10 is three volts, the input and output potentials for the D.-C. amplifier 14 will be three volts. Since, for proper operation, the counter must advance one step whenever the input wave signal exceeds the count in the counter by one unit, the diode circuit 95 of limiter 18 appropriately has a limiting action above a potential representing a positive unit error, i.e., above two volts. The limiter circuit 95 also provides limiting action for error signals below a minus 2 volts representing a negative error. Accordingly, with a three volt output from the amplifier 15, an input just above two volts is supplied to D.-C. amplifier 98 in view of the limiting action of the circuit 95. Amplifier 98 provides a suitable factor of gain such as, for example, a gain of 10. With the assumed input of three volts, therefore, its output is slightly above 20 volts.

With a signal of at least 20 volts applied to the differential amplifier 20, the high trigger 22 is energized to apply a negative pulse to the forward counting gate 131 which gates the next occurring clock pulse to turn over the multivibrator 143 of the first counting stage 31. Since the tube 146 of the multivibrator is conductive in the cleared state of the counter, upon turning over it will become non-conductive, thereby raising the potential on output line 41.

This raised potential on line 41 converts a positive output of cathode follower 68 in the diode switch 46 into a negative potential applied to the cathodes of coupling diodes 70, 71. The application of a negative potential to the coupling diodes 70, 71 drives the anodes of the switching diodes 72, 73 to a negative potential relative to their cathodes. In consequence, the switching diodes 72, 73 offer a high back resistance to current flowing through the associated resistance circuit 52 from tap 57. In other words, the potential at tap 57 representing one unit of feedback is applied to the input of the D.-C. amplifier 14 at the common junction 13 effectively as a minus two volts opposing the assumed positive input potential of three volts.

Since the output lines 42–45 for the stages of the counter 27 remaining in the 0 state are at their lower potential level, the associated diode switches 47–50 form a shunt for the associated circuits 53–56 of the summing resistive network 51. This comes about by the application of a positive rather than a negative potential from the output of each cathode follower 68 to the cathodes of associated coupling diodes 70, 71. With this positive potential applied to the coupling diodes 70, 71 the anodes of switching diodes 72, 73 are free to rise to ground potential bringing the resistor junction points of the associated circuits 53–56 likewise substantially to ground potential. Effectively, then, the potentials at the associated taps 58–61 are isolated from the input of the D.-C. amplifier 14. Consequently, the total effective voltage at the common junction 13 at the input of the D.-C. amplifier 15 is a positive one volt signal under the assumed conditions.

Since a signal requiring at least one unit change (i.e., at least two volts positive or 0.2 volt negative, for the exemplary values given) must be applied to the input of D.-C. amplifier 14 to necessitate a change in the count registered by the counter 27, a one volt input leaves the high and low counting gates 131, 134 of the counter in a closed condition. This follows, as the 10 volt output of D.-C. amplifier 98 resulting from a one volt input is insufficiently positive to result in application of a triggering potential to the high trigger 22 by the differential amplifier 20 and is not negative as required for a triggering of the low trigger 23. Both triggers 22 and 23, therefore, provide a relatively positive signal to the reverse and forward counting buses 24, 25 which precludes the passage of negative going pulses through the forward and backward gates 131 and 134. As the clock pulses are unable to reach any of the multivibrators of the several counter stages, the counter will remain stationary at the setting 00001 in response to the assumed three volt input.

It will be evident that with an increasingly high input wave signal at the terminal 10, the counter is caused to count forwardly by reason of a negative gating signal from the high trigger 22. As the input wave signal decreases, trigger 23 supplies a signal of negative polarity to open the associated backward counting gate 134. A subtraction of the binary count then occurs, with carries effected whenever a preceding stage as a 0 to 1 transition.

Considering more particularly the operation of the diode switches 46–50, it may be observed that application of a negative signal to the cathodes of the coupling diodes 70, 71 puts the switching diodes 72, 73 into a reverse operating condition which may be exemplified by the point 91 in Fig. 2. In this state, both the switching diodes 72, 73 and the compensating diodes 80, 83 offer an extremely high resistance such that the current through the corresponding resistance circuit is passed without appreciable attenuation to the common junction 13. It may be noted that with a 1 megohm feedback resistor 15 and network resistors 64, 65, 66 having the values 0.5 megohm, 0.5 megohm, and 1.0 megohm, respectively, the potentials at the tap points 56–61 must be double the potential normally required in the system by its scale factor (i.e., two volts per unit) to represent the binary orders 1, 2, 4, 8 and 16 for converting the digital output of the counter into analog form. Thus, the negative potentials at tap points 57–61 may be 4, 8, 16, 32 and 64 volts, respectively.

When the potential applied to the cathodes of the coupling diodes 70, 71 is positive, on the other hand, the anodes of the switching diodes 72, 73 are at ground potential less any potential drop in the corresponding shunt paths. Since the junction points of the resistors 64, 65, 66 will be negative due to the negative potential on the supply bus 63, each of the switching diodes 72, 73 will be in an operating condition represented by point 92 in the curve of Fig. 2. The point 92 is very close to the zero potential operating point for the diodes 72, 73 because of the high resistance offered by resistors 64, 65, namely, 0.5 megohm in a preferred design. Compensating diodes 80, 83, being connected in oppositely poled relation to the switching diodes 72, 73, will have an operating condition exemplified by a point 93 in the curve of Fig. 2 corresponding to a slight negative potential. Since the slopes in the curve at points 92 and 93 are substantially the same, indicating identity of the effective resistances of the switching and compensating diodes, and since the resistances 76, 81 and 77, 84 are paired for identical resistance, any changes arising from cathode emission in the compensating and switching diodes will not disturb the potential at their junction points. Consequently, the input to the D.-C. amplifier 14 is subjected to a minimum of zero drift.

While the accuracy with which the input wave signal $x(t)$ may be represented is dependent upon the degree of quantization, that is, by the number of stages of the counter 27 which may be effectively utilized, the accuracy of conversion for any particular degree of quantization will manifestly depend upon the accuracy of the comparison effected between the input signal and the feedback signal. From the foregoing description of the system in accordance with the present invention, it will be evident that a highly accurate comparison is afforded both by the use of precision resistors throughout the transmission paths of the currents added at the summation point and the effective compensation of the diode switches for zero drifts in their switching diodes. Moreover, the D.-C. feedback amplifier provides a highly linear summation of the input and feedback signals.

The summing network 51 may, if desired, be used with the diode switches independently of the other portions of the system to serve as a digital-to-analog converter. In such an application of the summing network and diode switches, the input terminal 10 ordinarily would not be utilized. However, a stand-off voltage might be applied at the terminal 10 if it were desired, for example, to add a coarse increment to the converted value of a digital input.

When utilized with the signal converting system as herein disclosed, the summing network together with the diode switches provide a more perfect realization of the capacities of the counter in speed and accuracy. It will be evident, of course, that the counter may have a variety of forms including magnetic as well as electronic counting flip-flops, and that various means other than the specific triggers and differential amplifiers shown may be utilized for reversibly controlling the direction and increment of the counting.

It will be understood, therefore, that the above-described embodiment of the invention is illustrative and that additional modifications will occur to those skilled in the art. Consequently, the invention is not to be limited to the specific apparatus disclosed herein but is defined by the appended claims.

I claim:

1. In a signal converting system, the combination comprising a plurality of series resistance circuits each having input terminal and an output terminal and at least two resistors connected in series therebetween adapted to pass a fixed current therebetween, said output terminals being connected to a common junction for summation of said currents, means for supplying between said input terminals and a point of fixed reference potential predetermined potentials for determining the values of said fixed currents, a switching diode for each resistance circuit having only a single electrode connected to the point intermediate said two resistors, for each of said diodes a third resistor connecting the other electrode to said point of fixed reference potential, said diodes being poled so as to tend to produce forward conduction therethrough, and means for applying a control signal to said other electrode of each of said diodes selectively to switch each diode to a reverse point of its characteristic.

2. In a signal converting system, the combination comprising a plurality of series resistance circuits each adapted to pass a fixed current, said circuits having a common junction for summation of said currents, for each of said resistance circuits at least two switching diodes connected in similarly poled shunt relation at spaced intermediate points along the resistance circuit, for each of said switching diodes a resistor connecting the same serially with a source of potential tending to produce forward conduction therethrough, and means associated with each of said circuits for applying a control signal simultaneously to the switching diodes connected therewith selectively to switch said diodes to a reverse point of their operating characteristic.

3. In a signal converting system, the combination as defined in claim 2, including a compensating diode connected at each of said spaced points in oppositely poled relation to the switching diode connected thereto, and a resistor for each of said compensating diodes to connect the same serially with said source of potential whereby said compensating diodes are continuously maintained at a reverse point in their operating characteristic.

4. In a signal converting system, the combination comprising a plurality of series resistance circuits each having an input terminal and an output terminal and at least two resistors connected in series therebetween and adapted to pass a fixed current therebetween, said output terminals being connected to a common junction for summation of said currents, means for supplying between said input terminals and a point of fixed reference potential predetermined potentials for determining the values of said fixed currents, a D.-C. operational amplifier having a resistive feedback circuit and an input connection to said common junction, a switching diode for each of said resistance circuits having only a single electrode connected to the point intermediate said two resistors, for each of said diodes a third resistor connecting the other electrode to said point of fixed reference potential, said diodes being poled so as to tend to produce forward conduction therethrough, and means for applying a control signal to said other electrode of each of said diodes selectively to switch each diode to a reverse point of its characteristic.

5. In a signal converting system, the combination comprising a plurality of series resistance circuits each adapted to pass a fixed current having a value representing an order of a permutation code group, said circuits having a common junction for summation of said currents, a D.-C. operational amplifier having a resistive feedback circuit and an input connection to said common junction for providing a linear version of said summation, for each of said resistance circuits at least two switching diodes connected at spaced intermediate points along the resistance circuit, for each of said diodes a resistor affording a series connection to a source of potential tending to produce forward conduction therethrough, and for each of said series resistance circuits means for applying a control signal representing one order of a permutation code group to each of the switching diodes associated therewith selectively to switch the same to a reverse point of their operating characteristics.

6. In a signal converting system, the combination comprising a plurality of series resistance circuits each having an input terminal and an output terminal and at least two resistors connected in series therebetween and adapted to pass a fixed current therebetween, said output terminals being connected to a common junction for summation of said currents, means for supplying between said input terminals and a point of fixed reference potential predetermined potentials for determining the values of said fixed currents, a switching diode for each resistance circuit having only a single electrode connected to the point intermediate said two resistors, for each of said switching diodes a third resistor connecting the other electrode to said point of fixed reference potential, said diodes being poled so as to tend to produce forward conduction therethrough, and means including a coupling diode having a like electrode connected to said other electrode for applying a control signal to said other electrode to switch the corresponding diode to a reverse point of its characteristic selectively in accordance with the polarity of the control signal.

7. In a signal converting system, the combination as defined in claim 6, wherein said means for applying a control signal further includes an n-stage binary register having the output of each stage coupled to said other electrode of the corresponding switching diode through said coupling diode.

8. In a signal converting system, the combination comprising a binary counter having a plurality of stages, a corresponding number of series resistance circuits each adapted to pass a fixed feedback signal representing the coded value of the associated stage, said circuits having a common junction for summation of said feedback signals, means including a D.-C. operational feedback amplifier having its input connected to said junction for controlling the counting of said counter, a shunt-type diode switch for each of said resistance circuits energized by the corresponding counter stage selectively to determine passage of the fixed feedback signal through such resistance circuits, and a resistance circuit for connecting an input wave signal to said common junction.

9. In a signal converting system, the combination comprising a binary counter having a plurality of stages, a corresponding number of series resistance circuits each adapted to pass a fixed feedback signal representing the coded value of the associated stage, said circuits having a common junction for summation of said feedback signals, means including a D.-C. operational feedback amplifier having its input connected to said junction to provide an output signal for controlling the count of said counter, a shunt-type diode switch for each of said resistance circuits, said diode switch comprising at least two switching diodes and a resistor for each, similar electrodes of said diodes being connected at spaced intermediate points of the associated series resistance circuit, said resistors affording connection to a source of potential tending to produce forward conduction in said diodes, means for coupling the output of each counter stage to the switching diodes of the corresponding diode switch selectively to switch each such diode to a reverse point of its operating characteristic, and a resistance circuit for connecting an input wave signal to said common junction for determining the count in said counter.

10. In a signal converting system, the combination as defined in claim 9, wherein each of said diode switches includes a compensating diode associated with each of said switching diodes by connection to the corresponding point of said series resistance circuits in oppositely poled relation, there being a resistor for each of said compensating diodes connecting the same with said source of potential, each of the diode switch resistors associated with a spaced point along said series resistance circuits being equal.

11. In a signal converting system, the combination comprising a binary counter having a plurality of stages, a corresponding number of series resistance circuits each adapted to pass a fixed feedback signal representing the coded value of the associated stage, said circuits having a common junction for summation of said feedback signals, means including a D.-C. operational feedback amplifier having its input connected to said junction to provide an output signal for controlling the count of said counter, a shunt-type diode switch for each of said resistance circuits, said diode switch comprising at least two switching diodes and a resistor for each, similar electrodes of said diodes being connected at spaced intermediate points of the associated series resistance circuit, said resistors affording connection to a source of potential tending to produce forward conduction in said diodes, and a compensating diode associated with each of said switching diodes by connection to the corresponding point of said series resistance circuits in oppositely poled relation, there being a resistor for each of said compensating diodes connecting the same with said source of potential, each of the diode switch resistors associated with a spaced point along said series resistance circuits being equal, said series resistance circuits comprising three series resistors each on the order of 1 megohm, the junctions of said series resistors corresponding with the aforementioned spaced points, means for supplying to the terminal of said series resistors remote from said common junction a potential representing the coded value of the associated counter stage, means for coupling the output of each counter stage to the switching diodes of the corresponding diode switch selectively to switch each such switching diode to a reverse point of its operating characteristic, and a resistance circuit for connecting an input wave signal to said common junction for determining the count in said counter.

12. In a signal converting system, the combination comprising a plurality of series resistance circuits each having an input terminal and an output terminal and at least two resistors connected in series therebetween and adapted to pass a fixed current therebetween, said output terminals being connected to a common junction for summation of said currents, means for supplying between the input terminals and a point of fixed reference potential separate fixed potentials for determining the values of said fixed currents, a switching diode for each resistance circuit having only a single electrode connected to the junction of the series resistors of such resistance circuit, for each of said diodes a third resistor connecting the other electrode to said point of fixed reference potential, each of said diodes being poled with respect to said potential supplying means for forward conduction of current therethrough, and means for applying a control signal to said other electrode of each of said diodes selectively to switch each diode to a reverse point of its characteristic.

References Cited in the file of this patent

UNITED STATES PATENTS

| | | |
|---|---|---|
| 2,316,044 | Blair | Apr. 6, 1943 |
| 2,564,017 | Maggio | Aug. 14, 1951 |
| 2,715,678 | Barney | Aug. 16, 1955 |
| 2,718,634 | Hansen | Sept. 20, 1955 |
| 2,731,631 | Spaulding | Jan. 17, 1956 |
| 2,736,889 | Kaiser | Feb. 28, 1956 |
| 2,754,503 | Forbes | July 10, 1956 |
| 2,869,115 | Doeleman | Jan. 13, 1959 |